United States Patent
Stark et al.

(10) Patent No.: US 6,823,653 B1
(45) Date of Patent: Nov. 30, 2004

(54) SANITARY PRECISION POLYMER FILM CASTING AND DISPERSION INJECTION SYSTEM

(76) Inventors: Patricia A. Stark, 12567 SW. Pembroke Cir. N., Lake Suzy, FL (US) 34269; Jon Zook, 8101 County Rd., #104, Ft. Myers, FL (US) 33919

( * ) Notice: Subject to any disclaimer, the term of this patent is extended or adjusted under 35 U.S.C. 154(b) by 44 days.

(21) Appl. No.: 10/378,183

(22) Filed: Mar. 3, 2003

(51) Int. Cl.[7] .............................................. B65B 47/02
(52) U.S. Cl. ........................ 53/560; 53/140; 222/146.5
(58) Field of Search .............................. 222/593, 146.2, 222/146.5; 53/560, 140, 141

(56) References Cited

U.S. PATENT DOCUMENTS

| | | | | |
|---|---|---|---|---|
| 2,309,545 A | * | 1/1943 | Scherer ........................ | 53/140 |
| 3,282,469 A | * | 11/1966 | Skonberg ................. | 222/146.5 |
| 3,982,669 A | * | 9/1976 | Moore ...................... | 222/146.5 |
| 4,195,755 A | * | 4/1980 | Slautterback et al. .... | 222/146.5 |
| 4,632,277 A | * | 12/1986 | Pallante ................... | 222/146.2 |
| 4,632,281 A | * | 12/1986 | Wold ........................ | 222/146.2 |
| 4,817,367 A | * | 4/1989 | Ishikawa et al. .............. | 53/560 |
| 5,148,947 A | * | 9/1992 | Epp et al. ................. | 222/146.5 |
| 5,683,578 A | * | 11/1997 | Zook et al. ............... | 222/146.2 |
| 6,340,473 B1 | * | 1/2002 | Tanner et al. ................ | 424/451 |
| 6,391,237 B1 | * | 5/2002 | Kearney et al. ............ | 264/132 |
| 6,499,631 B2 | * | 12/2002 | Zook ........................ | 222/146.6 |
| 6,745,546 B2 | * | 6/2004 | Tanner et al. ................. | 53/560 |

* cited by examiner

Primary Examiner—Louis Huynh
(74) Attorney, Agent, or Firm—Edward P. Dutkiewicz

(57) ABSTRACT

An output supply assembly includes a horizontal base. The base receives a container of a flowable material. A platen is positionable in the container. A pump feeds the flowable material from the container. A dispensing and handling assembly is provided. The dispensing and handling assembly includes two film-forming dies of similar configuration. Flowable material may be fed through the assembly to form film. A pair of film-movers are beneath the film-forming dies. A pair of cohesion dies are provided beneath the film-movers. An injector is located above the film-movers. In this manner the periodic dispensing of particulate material is allowed. Containers are formed upon the solidification of the flowable material moving between the cohesion dies. A pair of hoses is provided between the output supply assembly and the dispensing and handling assembly. A control assembly couples the output supply assembly and the dispensing and handling assembly.

1 Claim, 11 Drawing Sheets

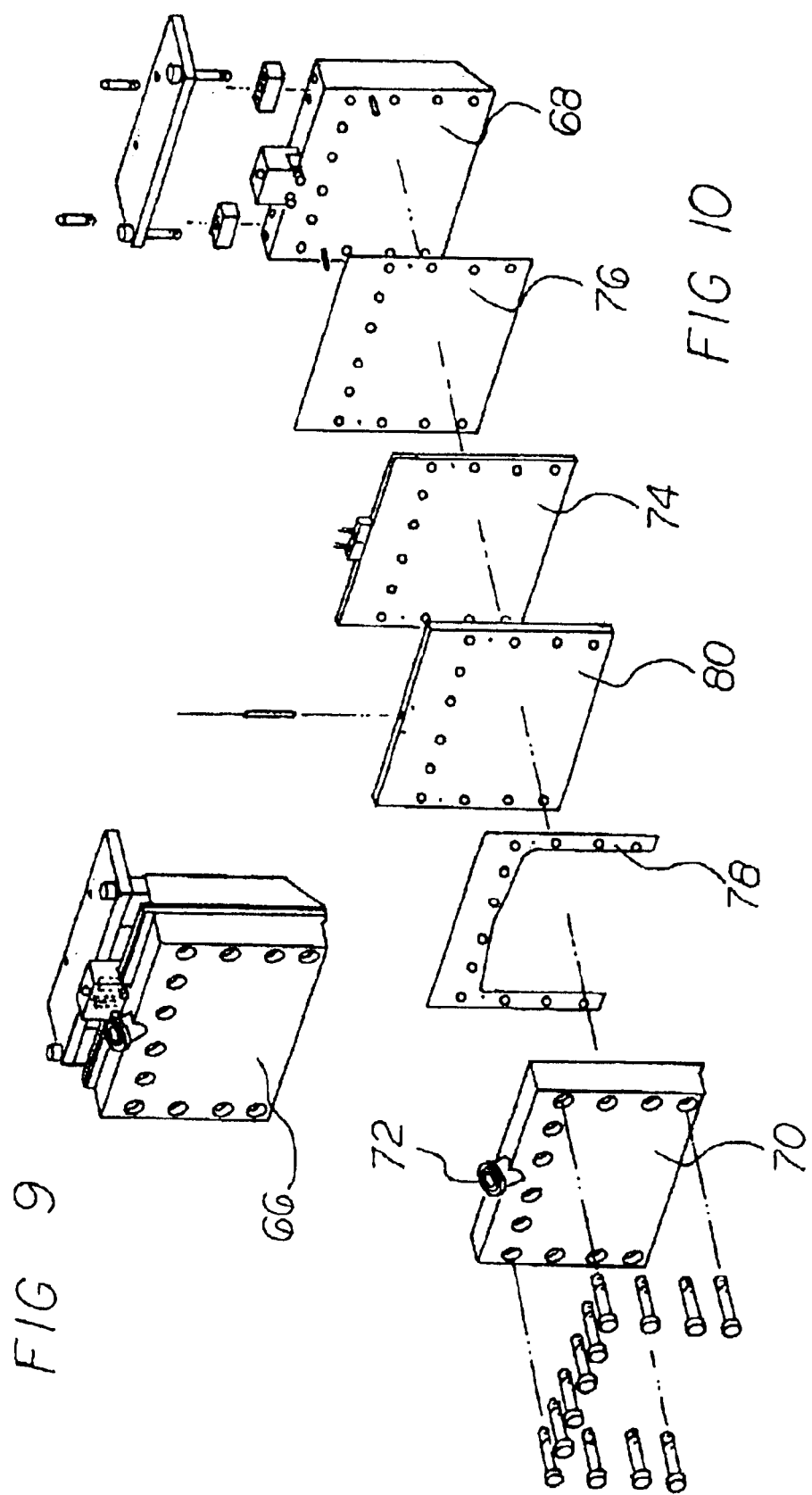

| BILL OF MATERIALS | |
|---|---|
| ITEM | DESCRIPTION |
| A | ONE PIECE SPECIAL STAINLESS STEEL FITTING |
| B | BRASS COMPRESSION SLEEVE |
| C | HOSE COLLAR PART A |
| D | HOSE COLLAR PART B |
| E | HOSE COLLAR PART C |
| F | PROTECTIVE CORD COVER |
| G | CLEAR PVC VACUUM TUBING |
| H | BLACK POLYESTER TAPE |
| I | THERMAL INSULATION |
| J | KAPTON TAPE |
| K | HEATER WIRE |
| L | STAINLESS STEEL BRAIDED TEFLON HOSE |
| M | SEALANT |

SANITARY PRECISION POLYMER FILM CASTING AND DISPERSION INJECTION SYSTEM

BACKGROUND OF THE INVENTION

1. Field of the Invention

The present invention relates to a sanitary precision polymer film casting and dispersion injection system and more particularly pertains to creating individual containers, packets and capsules of particulate matter such as medicine, soap and the like in a safe and economical manner.

2. Description of the Prior Art

The use of packaging systems of known designs and configurations is known in the prior art. More specifically, packaging systems of known designs and configurations previously devised and utilized for the purpose of creating containers for particulate matter through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,683,578 to Zook relates to a filter valve system for regulating, filtering, and dispensing a flow of hot melt materials and adhesive. U.S. Pat. No. 6,340,473 to Tanner relates to film forming compositions comprising modified starches and iota-carragreenan and methods for manufacturing soft capsules using same. U.S. Pat. No. 6,391,237 to Kearney relates to the formation of indicia in the base of a blister pack for transference to a body cast therein. U.S. Pat. No. 6,499,631 to Zook relates to a hot melt adhesive applicator.

While these devices fulfill their respective, particular objectives and requirements, the aforementioned patents do not describe a sanitary precision polymer film casting and dispersion injection system that allows creating individual containers, packets and capsules of particulate matter such as medicine, soap and the like in a safe and economical manner.

In this respect, the sanitary precision polymer film casting and dispersion injection system according to the present invention substantially departs from the conventional concepts and designs of the prior art, and in doing so provides an apparatus primarily developed for the purpose of creating individual containers, packets and capsules of particulate matter such as medicine, soap and the like in a safe and economical manner.

Therefore, it can be appreciated that there exists a continuing need for a new and improved sanitary precision polymer film casting and dispersion injection system which can be used for creating individual containers, packets and capsules of particulate matter such as medicine, soap and the like in a safe and economical manner. In this regard, the present invention substantially fulfills this need.

SUMMARY OF THE INVENTION

In view of the foregoing disadvantages inherent in the known types of packaging systems of known designs and configurations now present in the prior art, the present invention provides an improved sanitary precision polymer film casting and dispersion injection system. As such, the general purpose of the present invention, which will be described subsequently in greater detail, is to provide a new and improved sanitary precision polymer film casting and dispersion injection system and method which has all the advantages of the prior art and none of the disadvantages.

To attain this, the present invention essentially comprises a precision controlled output master supply assembly. The master supply assembly includes a horizontal base. The horizontal base receives a 35 to 200 gallon drum. The drum contains a polymer liquid or solid. The polymer is solid or liquid at ambient conditions, but when heated or treated with thermal conditions becomes a flowable material. The flowable material is used for forming a film and for cohesion. The drum has a first height and a first diameter. The drum has a platen. The platen is provided in a circular configuration. The platen has an upper surface and a lower surface. In general, the platen is fabricated of stainless steel and/or other applicable materials depending on the application. The platen has a second diameter. The second diameter is slightly less than the first diameter. The platen is positionable in the drum upon the surface of the polymer. The platen has a heating component. The platen further has an upper surface. The platen has outlet orifices. The platen has a lower surface. The lower surface is provided in a generally cone-shaped configuration. Spaced inlet orifices are provided. Passageways are further provided through the platen from the inlet orifices to the outlet orifices. In this manner polymer may pass through. A positive displacement pump is provided. The positive displacement pump is single or dual output. The pump is positioned on the upper surface of the platen. In this manner movement with the platen is provided. Positive feeding of polymer is also provided in this manner. Four equally spaced support rods are provided. The support rods are vertically disposed. The lower ends are slidably receiving the platen. An upper platform is provided. The upper platform has apertures. The apertures are provided for the passage of the support rods. A pair of laterally disposed guide rods are provided. The guide rods are provided parallel with the support rods-but located exterior of the drum. The support rods have associated supports. The associated supports have apertures. The apertures receive the rods. A cross brace is provided. The cross brace couples the upper ends of the support rods and the guide rods. In this manner the vertical reciprocation of the platen is effected downwardly corresponding to the exterior usage of the polymer.

An intermediate transfer assembly is provided. The transfer assembly includes a horizontal base. The horizontal base receives a bottom inlet 3 to 100 gallon heated and jacketed pail. A heated platen is provided. A heated component is provided in the heated platen. The heated platen has an upper surface. The upper surface has two outlet orifices. The heated platen also has a lower surface. The lower surface is provided in a generally cone-shaped configuration. The lower surface has spaced inlet orifices. Passageways are provided through the platen. The passageways are provided from the inlet orifices to the outlet orifices. In this manner the passage of polymer is allowed. The transfer assembly also includes a dual outlet pump, a double elevator, and a control assembly.

Provided next is a polymer dispensing assembly. The polymer dispensing assembly includes two in line dual state cleanable filter assemblies. Each filter assembly has an inlet and outlet. The polymer dispensing assembly also includes two filter elements and a central heated cleanable filter body.

A polymer handling assembly is provided next. The polymer handling assembly includes two dies. The dies are of similar configuration. Each of the dies has a mounting plate. Each of the dies has a distribution plate. The distribution plate is parallel with the mounting plate. The distribution plate has an upper edge. The upper edge has an aperture. The aperture receives liquid polymer. A heater plate is provided. The heater plate has an insulator dielectric plate. The insulator dielectric plate is provided between the heater and the mounting plate. A shim is provided in an inverted U-shaped configuration or any shape that might be required by the application. The shim is provided adjacent to the distribution plate. An extrusion face is provided between the shim and the heater. All the plates have a generally rectilinear configuration. All the plates further have an upper edge, a lower edge and side edges between the upper and lower edges. In this manner polymer may be fed through the distribution plate through the opening in the shim. The polymer handling assembly also includes a pair of roller conveyors. The roller conveyors are rotatable above parallel axes. The exterior surfaces of the roller conveyors are immediately beneath the shim. Also included in the polymer handling assembly is a pair of rotary cohesion dies. The rotary cohesion dies have axes. The axes of the rotary cohesion dies are parallel with each other and the axes of the roller conveyor located between the roller conveyors. The rotary cohesion dies are in closely spaced relationship with each other with circumferential pressure surfaces. The polymer handling assembly further includes a positive displacement pumping device. The pumping device provides dial-in incremental, thermal and precise dosage control. The pumping device is located above the rotary cohesion dies. In this manner the periodic dispensing of particulate materials between packets formed with the solidification of the polymer moving between the rotary cohesion dies is allowed.

Further provided are sanitary primary thermal hoses. These primary hoses are provided between the precision controlled master output supply assembly and the intermediate transfer assembly. A pair of second hoses is provided. The second pair of hoses is provided between the intermediate transfer station and the polymer dispensing and handling assembly. The hoses include cleanable sanitary supply tubes. The supply tubes are fabricated of a flexible material. The tubes have braided metallic wire on their exterior surfaces. An electrical heating wire is provided. The wire is wrapped around the exterior surface of the supply tube. An electrical insulator is provided over the supply tube.

Provided last is a control assembly. The control assembly couples the precision controlled output master supply assembly and the polymer dispensing and handling assembly. In this manner the continuous and automatic control of the speed of the sanitary pump, the rate of rotation of the rollers, the heat of the tubes, the platen and the dies is provided.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sanitary precision polymer film casting and dispersion injection system which has all of the advantages of the prior art packaging systems of known designs and configurations and none of the disadvantages.

It is another object of the present invention to provide a new and improved sanitary precision polymer film casting and dispersion injection system which may be easily and efficiently manufactured and marketed.

It is further an object of the present invention to provide a new and improved sanitary precision polymer film casting and dispersion injection system which is of durable and reliable constructions.

An even further object of the present invention is to provide a new and improved sanitary precision polymer film casting and dispersion injection system which is susceptible of a low cost of manufacture with regard to both materials and labor, and which accordingly is then susceptible of low prices of sale, thereby making such sanitary precision polymer film casting and dispersion injection system economically available.

Even still another object of the present invention is to provide a sanitary precision polymer film casting and dispersion injection system for creating individual containers, packets and capsules of particulate matter such as medicine, soap and the like in a safe and economical manner.

Lastly, it is an object of the present invention to provide a new and improved sanitary precision polymer film casting and dispersion injection system. An output supply assembly includes a horizontal base. The base receives a container of a flowable material. A platen is positionable in the container. A pump feeds the flowable material from the container. A precision dispensing and handling assembly is provided. The dispensing and handling assembly includes two film-forming dies of similar configuration. Flowable material may be fed through the assembly to form film. A pair of film-movers are beneath the film-forming dies. A pair of cohesion dies are provided beneath the film-movers. An injector is located above the film-movers. In this manner the periodic dispensing of particulate material is allowed. Containers are formed upon the solidification of the flowable material moving between the cohesion dies. A pair of thermal sanitary hoses is provided between the output supply and the dispensing and handling assembly. A control system couples the output supply and the dispensing and handling assemblies.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an enlarged perspective view of one slot die shown in FIGS. 1 and 2.

FIG. 10 is an exploded perspective view of the component of FIG. 9.

The same reference numerals refer to the same parts throughout the various Figures.

DESCRIPTION OF THE PREFERRED EMBODIMENT

Figure 1:
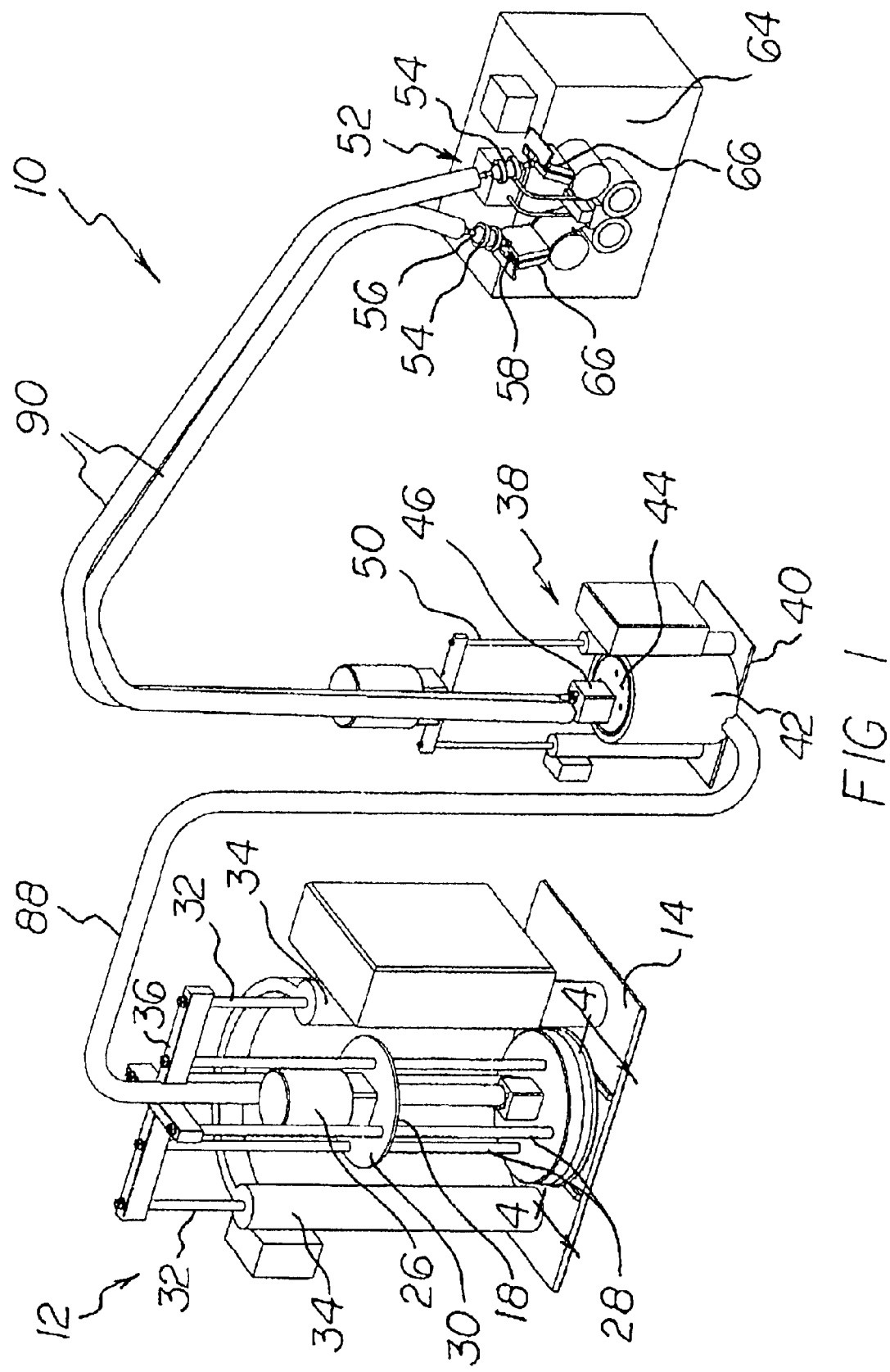
FIG. 1 is perspective illustration of a sanitary precision polymer film casting and dispersion injection system constructed in accordance with the principles of the present invention.
Figure 2:
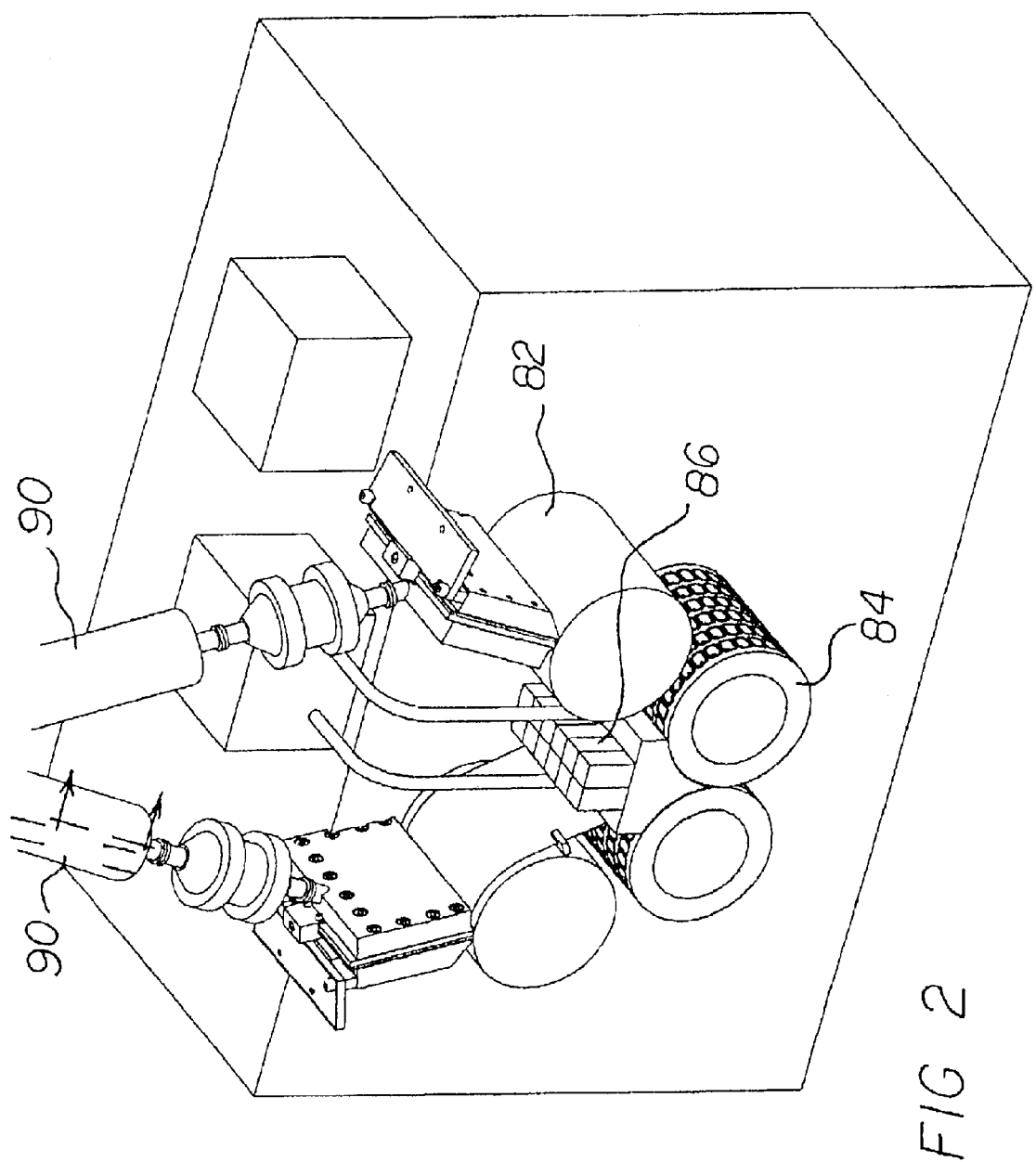
FIG. 2 is an enlarged perspective view of the polymer dispensing and handling assemblies shown in FIG. 1.
Figure 3:
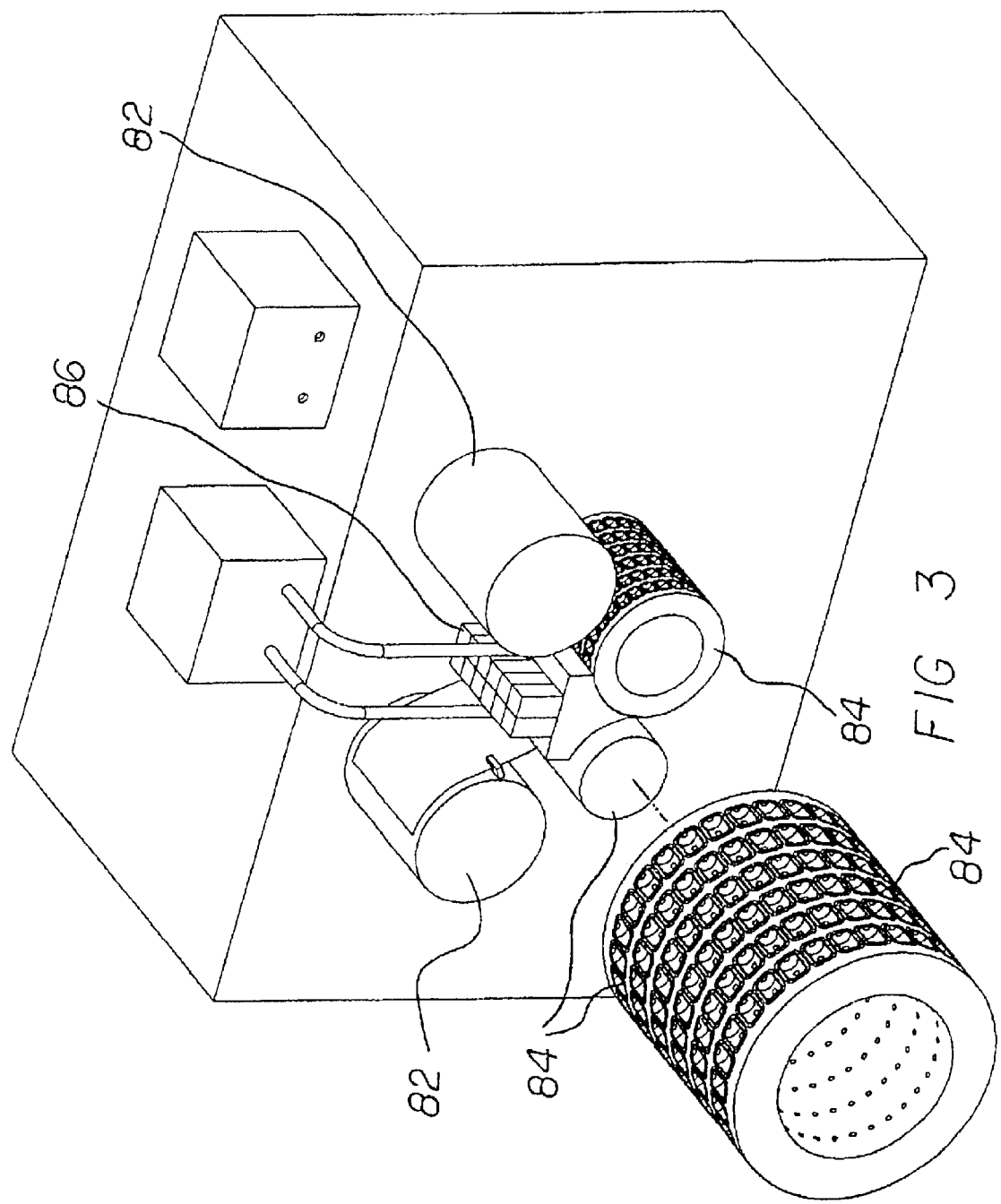
FIG. 3 is an enlarged perspective view of the assembly shown in FIG. 2 but with the dies removed and one roller displaced and enlarged.
Figure 4:
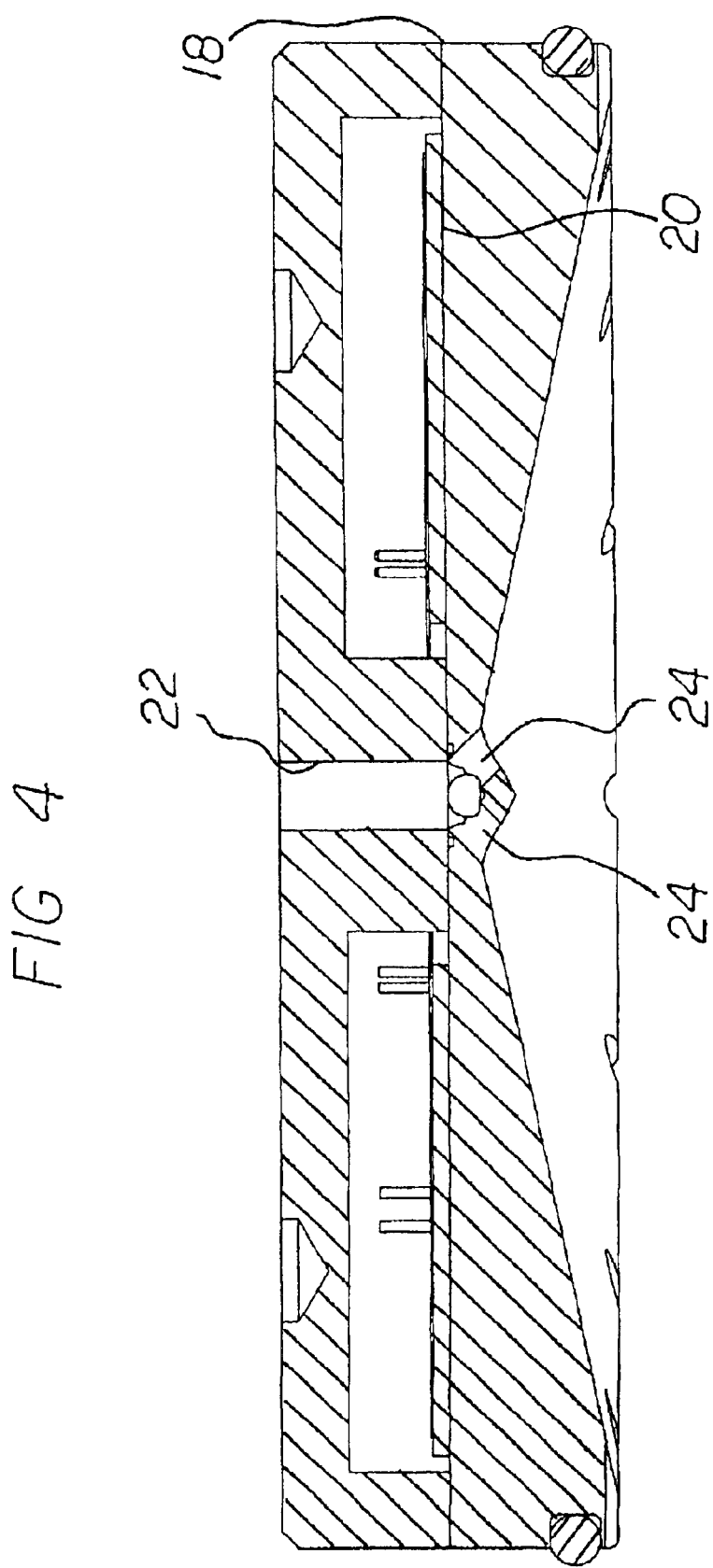
FIG. 4 is a cross-sectional view of the platen taken at line 4—4 of FIG. 1.
Figure 5:
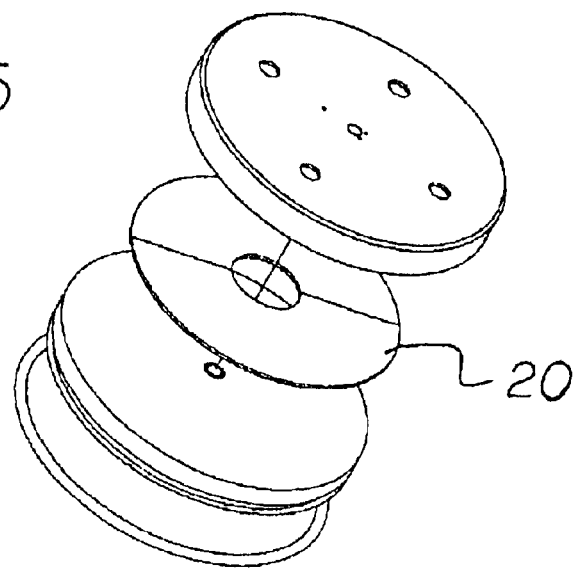
FIG. 5 is an exploded perspective view of the component of FIG. 4.
Figure 5A:
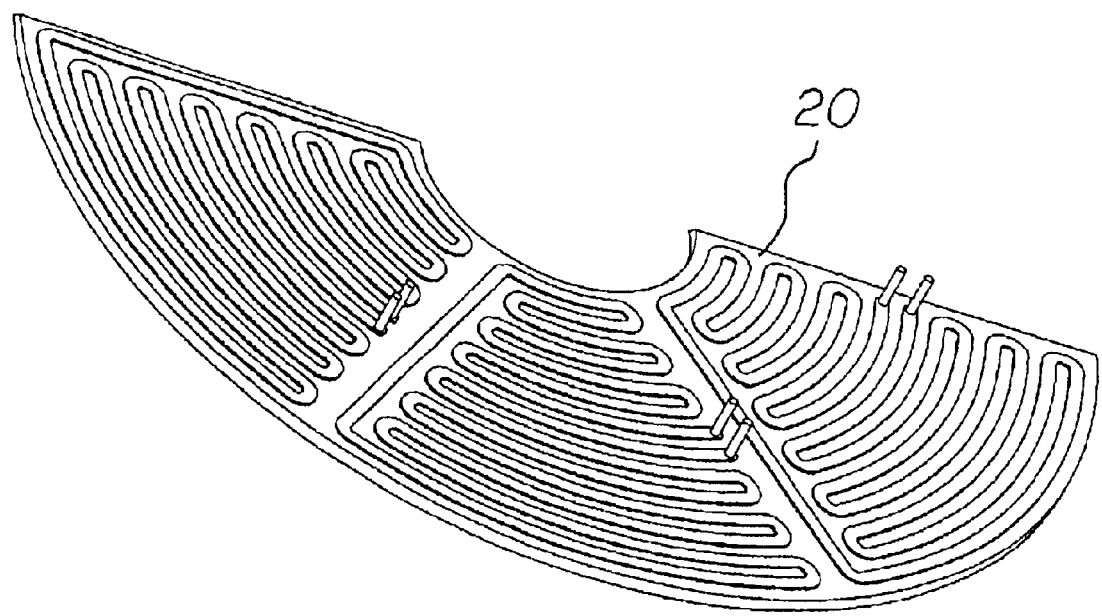
FIG. 5A is an enlarged perspective view of one half of the heating element of FIG. 5.

With reference now to the drawings, and in particular to FIG. 1 thereof, the preferred embodiment of the new and improved sanitary precision polymer film casting and dispersion injection system embodying the principles and concepts of the present invention and generally designated by the reference numeral 10 will be described.

The present invention, the sanitary precision polymer film casting and dispersion injection system 10 is comprised of a plurality of components. Such components in their broadest context include an output supply assembly, a dispensing and handling assembly, a pair of hoses, and a control assembly. Such components are individually configured and correlated with respect to each other so as to attain the desired objective.

First provided is a precision controlled output master supply assembly 12. The master supply assembly includes a horizontal base 14. The horizontal base is of a size and shape to receive a large drum, preferably a 35 to 200 gallon drum 16. The drum contains a polymer liquid or solid. The polymer is solid at ambient conditions but when heated becomes a flowable material. The flowable material is used for forming a film and for cohesion in creation of the final product.

The drum has a first height and a first diameter. The drum and its contents receives thereon a platen 18. The platen is provided in a circular configuration. The platen has an upper surface and a lower surface. The platen is fabricated of stainless steel. The platen has a second diameter. The second diameter is slightly less than the first diameter. The platen is positionable in the drum upon the surface of the polymer. The platen has a heating component 20 between upper and lower sections with an o-ring there around. The platen further has an upper surface. The platen has a single outlet orifices 22. The platen has a lower surface. The lower surface is provided in a generally cone-shaped configuration. Spaced inlet orifices 24 are provided. Passageways are further provided through the platen from the inlet orifices to the outlet orifices. In this manner polymer may pass through.

A positive displacement pump 26 is provided. The positive displacement pump is single or dual output. The pump is positioned on the upper surface of the platen. In this manner movement with the platen is provided. Positive feeding of polymer is also provided in this manner. Four equally spaced support rods 28 are provided. The support rods are vertically disposed. The lower ends are slidably receiving the platen. An upper platform 30 is provided. The upper platform has apertures. The apertures are provided for the passage of the support rods. A pair of laterally disposed guide rods 32 are provided. The guide rods are provided parallel with the support rods but located exterior of the drum. The support rods have associated supports 34. The associated supports have apertures. The apertures receive the rods. A cross brace 36 is provided. The cross brace couples the upper ends of the support rods and the guide rods. In this manner the vertical reciprocation of the platen is effected downwardly corresponding to the exterior usage of the polymer.

An intermediate transfer assembly 38 is provided. The intermediate transfer assembly includes a horizontal base 40. The horizontal base receives a bottom inlet 3 to 100 gallon or other small heated and jacketed pail 42. A heated platen 44 is provided. A heated component is provided in the heated platen. The heated platen has an upper surface. The upper surface has two outlet orifices, one for each hose. The heated platen also has a lower surface. The lower surface is provided in a generally cone-shaped configuration. The lower surface has spaced inlet orifices, preferably two for each hose. Passageways are provided through the platen. The passageways are provided from the inlet orifices to the outlet orifices. In this manner the passage of polymer is allowed similar to that of the first platen. The transfer assembly also includes a dual outlet pump 46, a double elevator 48, and a control assembly 50.

Figure 6:
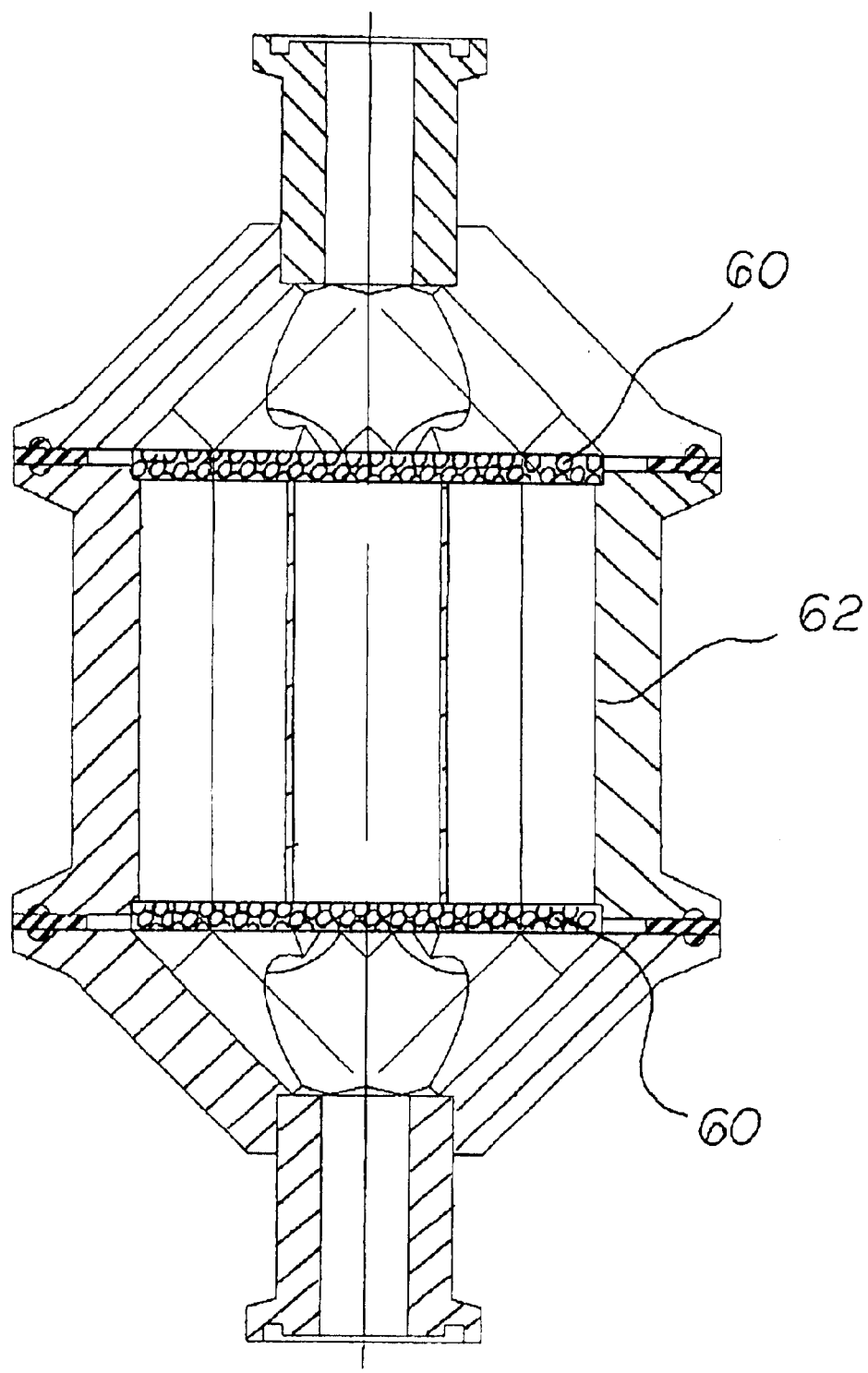
FIG. 6 is a cross-sectional view of the filter taken at line 6—6 of FIG. 2.
Figure 7:
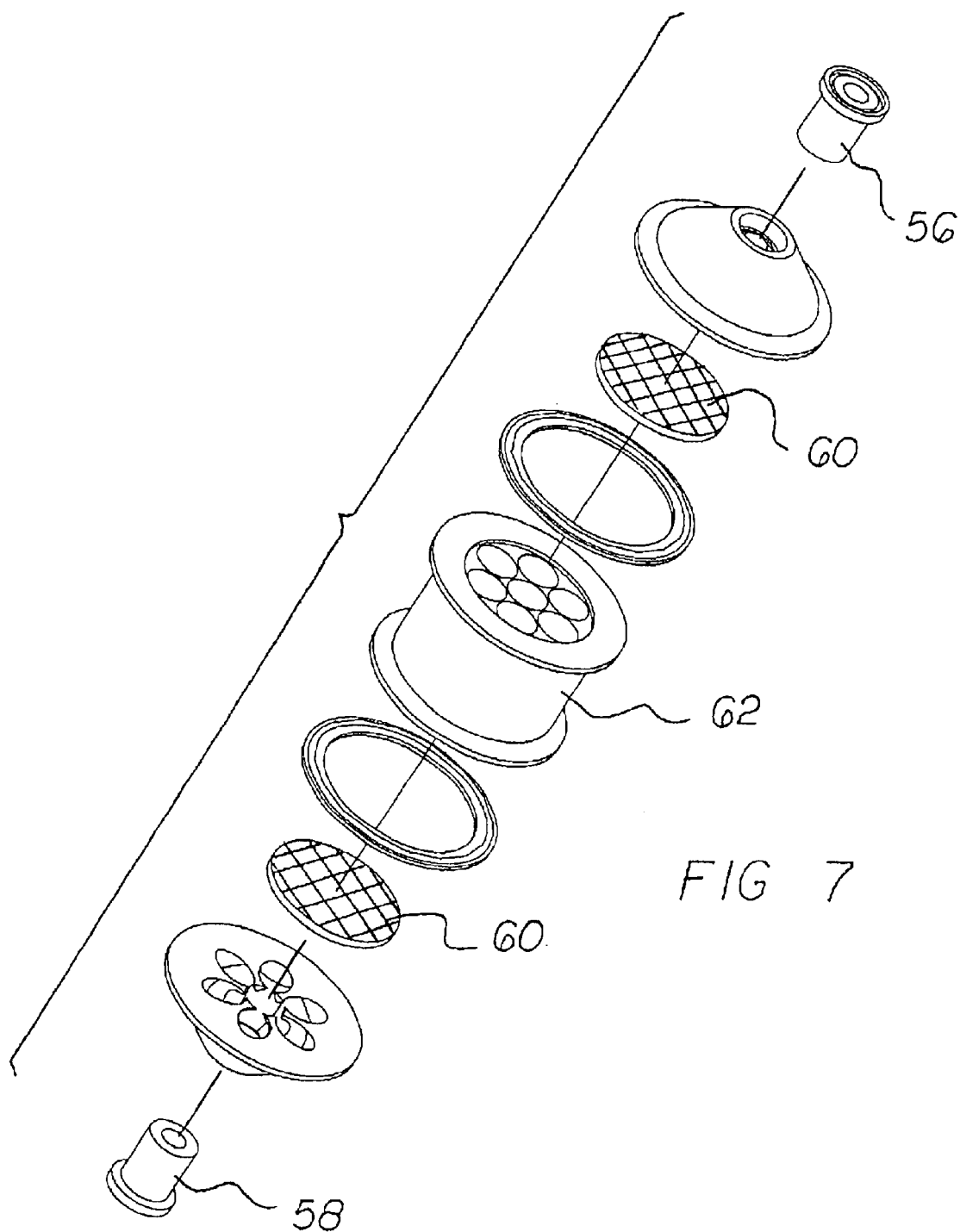
FIG. 7 is an exploded perspective view of the component of FIG. 6.

Provided next is a polymer dispensing assembly 52. Note FIGS. 6 and 7. The polymer dispensing assembly includes two in line dual state cleanable filter assemblies 54. Each filter assembly has an inlet 56 and outlet 58. The polymer dispensing assembly also includes two filter elements 60. Cone shaped connectors are between the inlet and outlet pieces and the adjacent filters. A central heated cleanable filter body 62 is centrally located with o-rings there adjacent.

A polymer handling assembly 64 is provided next. The polymer handling assembly includes two dies 66. The dies are of similar configuration. Each of the dies has a mounting plate 68. Each of the dies has a distribution plate 70. The distribution plate is parallel with the mounting plate. The distribution plate has an upper edge. The upper edge has an aperture 72. The aperture receives liquid polymer. A heater plate 74 is provided. The heater plate has an insulator dielectric plate 76. The insulator dielectric plate is provided between the heater and the mounting plate. A shim 78 is provided in an inverted U-shaped configuration or any shape that might be required by the application. The shim is provided adjacent to the distribution plate. An extrusion face 80 is provided between the shim and the heater. All the plates have a generally rectilinear configuration.

All the plates have an upper edge, a lower edge and side edges between the upper and lower edges. In this manner polymer may be fed through the distribution plate through the opening in the shim. The polymer handling assembly also includes a pair of roller conveyors 82. The roller conveyors are rotatable above parallel axes. The exterior surfaces of the roller conveyors are immediately beneath the shim. Also included in the polymer handling assembly is a pair of rotary cohesion dies 84. The rotary cohesion dies have axes. The axes of the rotary cohesion dies are parallel with each other and the axes of the roller conveyor located between the roller conveyors. The rotary cohesion dies are in closely spaced relationship with each other with circumferential pressure surfaces.

Figure 8:
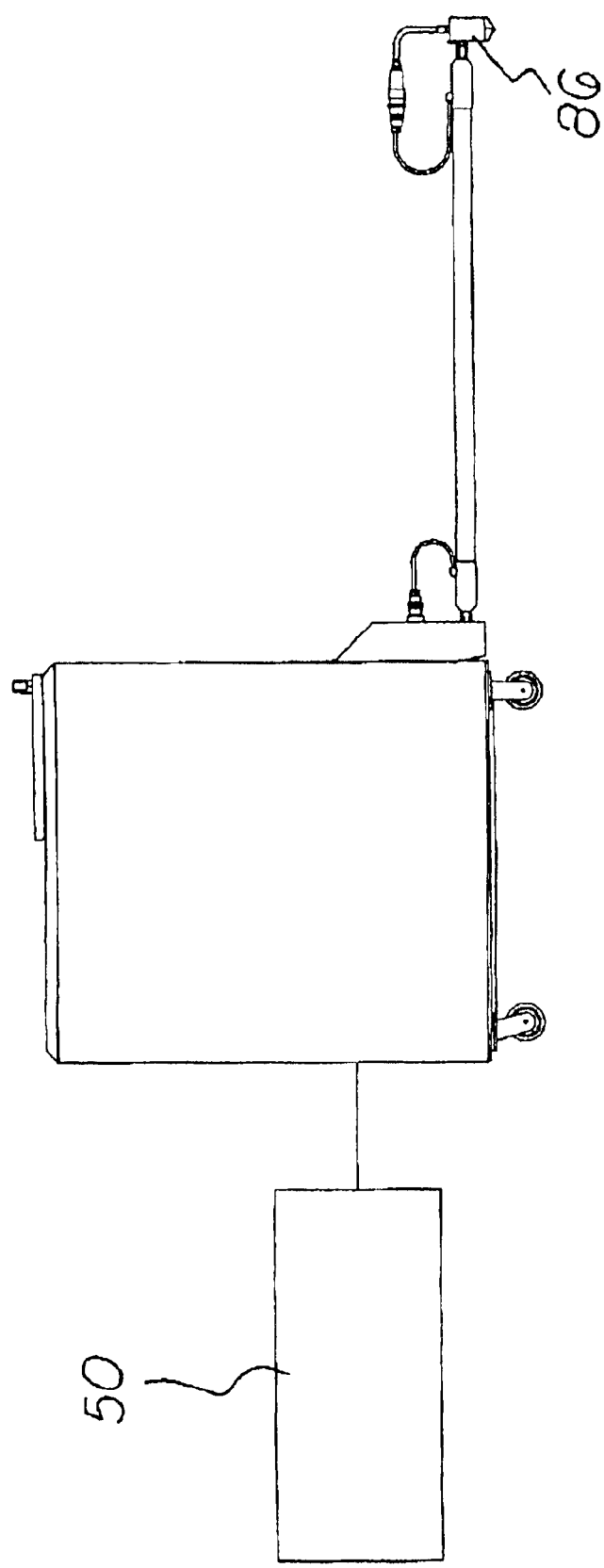
FIG. 8 is a side elevational view of the system shown in FIG. 1 but with the dispensing and handling assemblies removed.

The polymer handling assembly further includes a pneumatic or electronic controlled positive displacement pumping device 86. The pumping device provides dial-in incremental, thermal and precise dosage control 50. The pumping device is a wedge located above the rotary cohesion dies. In this manner the periodic dispensing of particulate materials between packets formed with the solidification of the polymer moving between the rotary cohesion dies is allowed. The particulate materials is from an adjacent supply there above with lines there adjacent. Note FIG. 8.

Further provided is a sanitary primary thermal hose 88. The primary hoses are provided between the precision controlled master output supply assembly and the intermediate transfer assembly. A pair of second hoses 90 is provided. The second pair of hoses is provided between the intermediate transfer station and the polymer dispensing and handling assembly. The hoses include cleanable sanitary supply tubes. The supply tubes are fabricated of a flexible material. The tubes have braided metallic wire on their exterior surfaces. An electrical heating wire is provided. The wire is wrapped around the exterior surface of the supply tube. An electrical insulator is provided over the supply tube.

Figures 11, 11A:
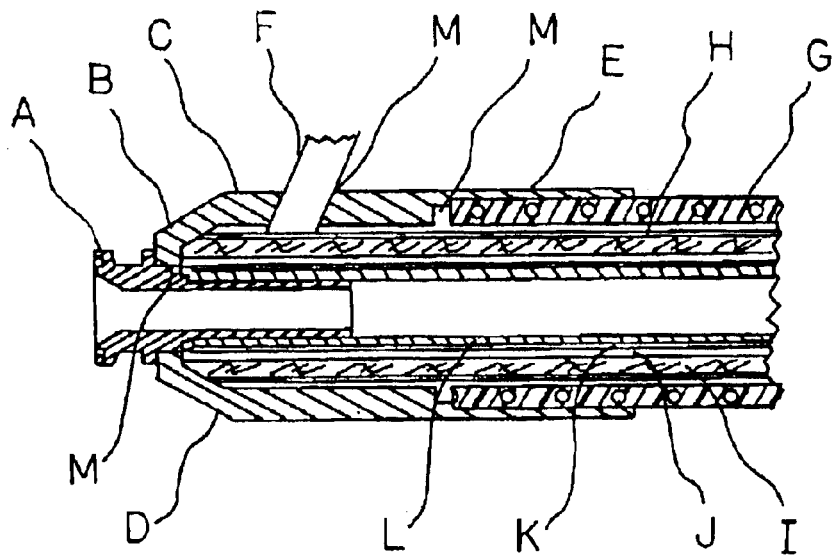
FIG. 11 is a cross-sectional view of a hose taken at line 11—11 of FIG. 2.
FIG. 11A is a bill of materials of the hose of FIG. 11.

FIG. 11 as a cross sectional showing of a portion of one hose. Each hose is of a similar construction and includes a one piece special stainless steel fitting A, a brass compression sleeve B, a hose collar part C, a hose collar part D, a hose collar part E, a protective cord cover F, a clear PVC vacuum tubing C, black polyester tape H, a thermal insulator I, a Kapton brand tape J, a heater wire K, a stainless steel braided Teflon brand hose L and a sealant M.

Figure 12:
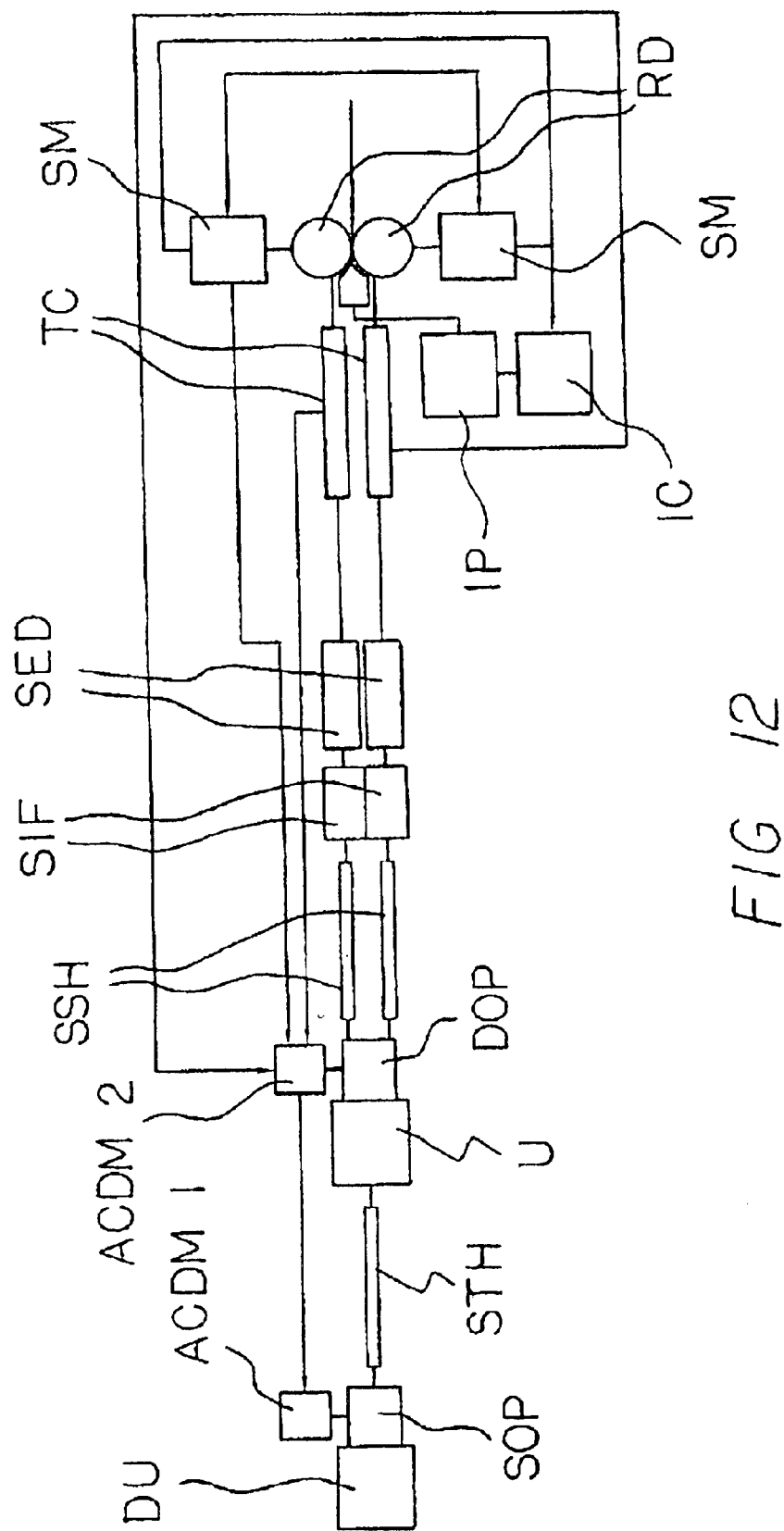
FIG. 12 is a schematic illustration of the control system of the prior Figures.

Provided last is a control assembly 50. The control assembly couples the precision controlled output master supply assembly and the polymer dispensing and handling assemblies. In this manner the continuous and automatic control of the speed of the pump, the rate of rotation of the rollers, the heat of the tubes, the platen and the dies is provided. With greater specificity to FIG. 12, there are shown two rotary dies RD, elements 82 in the prior Figures. Stepper motors SM drive the rollers. On the input side of the rollers is a wedge for introducing particulate material to between the rollers and polymer sheets to be cohered for surrounding and encapsulating the material. The wedge is fed by the injection pump IP and controlled by the injection control IC which in turn is controlled by the stepper motors. The final product is on the side of the rollers remote from the wedge.

The sanitary extrusion dies SED feed the rotary dies RD with electronic web thickness controls TC there between. The sanitary in line filters SIF feed the sanitary extrusion dies from parallel sanitary supply hoses SSH. The hoses are fed from the pail 42 unloader U through the dual output sanitary pump DOP. The unloader U is fed by the single output sanitary pump SOP from the sanitary 35 to 200 gallon drum unloader DU through the sanitary transfer hose STH. Two AC drive motors ACDM-1 and ACDM-2 power the single and dual sanitary pumps.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sanitary precision polymer film casting and dispersion injection system for creating individual containers of particulate matter in a safe and economical manner comprising, in combination:

(A) a precision controlled output master supply assembly including (i) a horizontal base for the receipt of a 35 to 200 gallon drum of a polymer, the polymer being solid at ambient conditions but when heated becomes a flowable material for forming a film and for cohesion, the drum having a first height and a first diameter, (ii) a platen in a circular configuration having an upper surface and a lower surface, the platen being fabricated of stainless steel with a second diameter slightly less than the first diameter and positionable in the drum upon the surface of the polymer, the platen having a heating component there within and an upper surface with an outlet orifices and a lower surface in a generally cone-shaped configuration with spaced inlet orifices and with passageways through the platen from the inlet orifices to the outlet orifices for the passage of polymer there through, (iii) a positive displacement pump, positioned on the upper surface of the platen for movement therewith and for the positive feeding of polymer, (iv) four equally spaced support rods vertically disposed with lower ends slidably receiving the platen and an upper platform with apertures for the passage of the support rods there through, (v) a pair of laterally disposed guide rods parallel with the support rods but located exterior of the drum with associated supports with apertures for receiving the rods and (vi) a cross brace coupling the upper ends of the support rods and the guide rods to effect the vertical reciprocation of the platen downwardly corresponding to the exterior usage of the polymer;

(B) an intermediate transfer assembly including a (i) horizontal base for the receipt of a bottom inlet 3 to 110 gallon heated, jacketed pail, a (ii) heated platen having a heating component there within and an upper surface with two outlet orifices and a lower surface in a generally cone-shaped configuration with spaced inlet orifices and with passageways through the platen from the inlet orifices to the outlet orifices for the passage of polymer there through, a (iii) dual outlet pump, a (iv) double elevator, and a (v) control assembly;

(C) a polymer dispensing assembly including (i) two inline dual state cleanable filter assemblies each filter assembly having an inlet and outlet, (ii) two filter elements, and (iii) a central heated cleanable filter body;

(D) a polymer handling assembly including (i) two dies of similar configuration, each of the dies having a mounting plate, a distribution plate parallel with the mounting plate, the distribution plate having an upper edge with an aperture for the receipt of liquid polymer, a heater plate with an insulator dielectric plate between the heater and the mounting plate, a shim in an inverted U-shaped configuration adjacent to the distribution plate and an extrusion face between the shim and the heater, all the plates having a generally rectilinear configuration with an upper edge, a lower edge and side edges there between whereby polymer may be fed through the distribution plate there through the opening in the shim, (ii) a pair of roller conveyors rotatable above parallel axes with exterior surfaces immediately beneath the shim, (iii) a pair of rotary cohesion dies having axes parallel with each other and the axes of the roller conveyor located between the roller conveyors, the rotary cohesion dies being in closely spaced relationship with each other with circumferential pressure surfaces, and (iv) a positive displacement pumping device providing dial-in incremental, thermal and precise dosage control located above the rotary cohesion dies for the periodic dispensing of particulate materials between packets formed with the solidification of the polymer moving between the rotary cohesion dies;

(E) primary hoses in fluid communication with the precision controlled master output supply assembly and the intermediate transfer assembly and a pair of second hoses in fluid communication with the intermediate transfer assembly and the polymer dispensing assembly, the hoses including cleanable sanitary supply tubes of flexible material with braided metallic wire on their exterior surface and an electrical heating wire wrapped around the exterior surface of the supply tube with an electrical insulator thereover; and (F) a control assembly coupling the precision controlled output master supply assembly the intermediate transfer assembly, the polymer dispensing assembly, and the polymer handling assembly for continuous and automatic control of the speed of the pumps and the rate of rotation of the roller conveyors and the temperature heat of the tubes and the platens and the dies.

* * * * *